United States Patent Office

3,334,129
Patented Aug. 1, 1967

3,334,129
ACETYLSALICYLIC ACID DERIVATIVES
Jean-Eugene Thuillier, Paul Rumpf, and Germaine Thuillier, born Nachmias, Paris, France, assignors to Centre National de la Recherche Scientifique and Institut National d'Hygiene, both of Paris, France, and both corporations of France
No Drawing. Filed Apr. 13, 1964, Ser. No. 359,492
Claims priority, application France, Apr. 18, 1963, 931,922; Feb. 10, 1964, 963,200
1 Claim. (Cl. 260—469)

This invention relates to acetylsalicylic acid derivatives.

It is an object of this invention to provide new derivatives of acetylsalicylic acid which are useful for therapeutic purposes.

A further object is to provide new pharmaceutical compositions containing substances which produce analgesic and antipyretic effects.

According to an aspect of this invention, we provide acetylsalicylic acid derivatives corresponding to the general formula

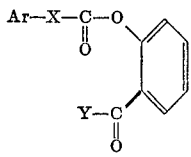

in which the symbols have the significances tabulated below.

| No. of the compound | Ar | X | Y |
|---|---|---|---|
| 1079 | Cl—C₆H₄— | —O—CH₂— | HO— |
| 1094 | Cl—C₆H₄— | —O—CH(CH₃)— | HO— |
| 1105 | Cl—C₆H₄—(CH₃) | —O—CH₂— | HO— |
| 1106 | Cl—C₆H₃—Cl | —O—CH₂— | HO— |
| 1107 | Cl—C₆H₄— | —S—CH₂— | HO— |
| 1109 | Cl—C₆H₄— | —O—CH₂— | H₂N— |
| 1123 | naphthyl | —CH₂— | HO— |

The first compound, i.e. p-chlorophenoxy-acetylsalicylic acid may be prepared by applying the known methods of esterification of phenols; more particularly, one may react salicylic acid and a functional derivative of p-chlorophenoxyacetic acid, especially the acid chloride in equimolar amounts; the reaction of salicylic acid with p-chlorophenoxy-acetic acid chloride may be conducted by heating while stirring, until release of hydrogen chloride comes to an end, or, alternatively, it may be carried out in the presence of a hydrogen chloride acceptor, more particularly a tertiary base such as pyridine or dimethylaniline, without any heat supply.

In the first case, the reaction mixture may be brought slowly to a temperature of about 130° C., and heating kept on while stirring for about 4 hours, then the product may be washed twice with carbon tetrachloride in order to be freed from unreacted salicylic acid and acid chloride; p-chloro-phenoxy-acetyl-salicylic acid is then recrystallized from 75% vol. ethyl alcohol; the melting point of the acid is then 158–159° C. (decomposition).

When working in the presence of dimethylaniline or pyridine, there occurs a spontaneous rise in temperature up to 40–50° C.; the temperature is kept at said value for 3 to 4 hours; the mixture is then poured into dilute, ice-cold hydrochloric acid, after which the precipitate is separated and recrystallized from toluene.

p-Chloro-phenoxy-acetyl-salicylic acid is obtained as a white, amorphous, odourless, insipid and water-insoluble powder.

The other compounds may be prepared by using known methods for esterifying phenols or thiophenols or, as far as the amide is concerned (compound No. 1109) by applying a known method of amidation, such as by reacting ammonia with p-chloro-phenoxy-acetylsalicylic acid chloride.

The following example illustrates the preparation of the amide:

EXAMPLE 30.6 g. of p-chloro-phenoxy-acetylsalicylic acid were dissolved into 250 ml. of anhydrous benzene, containing 1 ml. of pyridine, then 40 ml. of thionyl chloride were added slowly to said solution while keeping temperature below +10° C. The mixture was then refluxed for 10 hours. Benzene and excess thionyl chloride were removed under reduced pressure, then an excess of gaseous ammonia was added to the crude acid chloride obtained, working in anhydrous ether at a temperature kept above 15° C. When the reaction of the solution had become alkaline, said solution was stirred for 30 minutes. The amide obtained was then centrifuged, washed with water for removing ammonium chloride, and recrystallized from 97% ethyl alcohol. M.P.=194°C.

The melting points of the various compounds are summed up in the following table.

TABLE 1

| Compounds No.: | Melting point, ° C. |
|---|---|
| 1079 | 158–159 |
| 1094 | 175 |
| 1105 | 151 |
| 1106 | 193 |
| 1107 | 127 |
| 1109 | 194 |
| 1123 | 161 |

Pharmacological studies enabled comparison to be made with aspirin only to a limited extent, aspirin being, as is well known, practically devoid of activity with respect to animals.

In the experiments herebelow reported, the dispersions for oral administration were prepared with gum syrup. Dispersions for parenteral administration were prepared with Tween 80 and distilled water at a temperature of about 40° C.

1. *Para-chlorophenoxy-acetylsalicylic acid*

Toxicity:
(a) Acute toxicities (evaluated according to Litchfield's method) are as follows—

Mouse, p.o. _____ $LD_{50}=1425$ mg./kg.
Mouse, i.v. _____ $LD_{50}=$about 300 mg./kg.

(b) Study of subacute toxicity in rat (duration, 2 weeks; administration route, oral) led to the following results—

G./kg. daily:
1 _____ 4 dead out of five.
0.5 _____ 3 dead out of five.
0.25 _____ 0 dead out of five.
0.10 _____ 0 dead out of five.

Action on arterial blood pressure and breathing:

In urethane-anaesthetized rabbit, administration of the new acid, in a dose amounting from 15 mg./kg. to 40 mg./kg. of body weight, caused a transient hypotension. The drug seemed to diminish the hypertensive action of adrenalin. With regard to breathing, the drug seemed devoid of any action, either on amplitude or on respiratory rhythm.

Analgesic activity:

The test in use was the heat-stimulation method on the mouse tail (Thorp, 1946, Brit. J. Pharmacol., I, 113). We observed a protraction of reaction times after oral administration of 200 mg./kg. Thus, for instance, the reaction time which was 4 seconds before administering the new compound, was prolonged to 11 seconds after a 15 minutes period and this until 45 minutes.

With a dose of 400 mg./kg. per os, the reaction time which averaged 3½ seconds was prolonged to 13 seconds on the average, and this for about one hour.

In identical conditions, the study of the action of aspirin in a dose of 400 mg./kg. per os ($LD_{50}$ per os being 1100 mg./kg. according to Hart, J. Pharm. Exp. Therap. 89, 205, 1947) led to the following results:

Average reaction time before administration of aspirin—4½ seconds.

Average reaction time after administration of aspirin—10 seconds.

Anti-inflammatory activity:

It was studied using the test of the dextran-induced oedema of rat leg. After administration of 400 mg./kg., one observed a slight inhibition of the oedema compared with non-treated controls; for a one hour duration, a 15% inhibition was obtained.

In this experiment, aspirin was ineffective.

Anti-pyretic activity:

It was studied by using the test of hyperthermy induced by intravenous administered anti-gonococcal vaccine. With doses of 250 mg./kg. and 400 mg./kg., we observed a lowering of the hyperthermic peak by 1 to 1.5° C. In identical conditions, aspirin exhibited no activity.

II. *Other compounds*

Their pharmacological properties are similar to those of para-chlorophenoxy-acetylsalicylic acid. Toxicity, analgesic and anti-inflammatory activities were determined as above described. The corresponding values are recorded in the following table, where "A test" is the mouse tail heat-stimulation and "B test" is the test of inhibition of the dextran-induced oedema in the rat.

TABLE II

| Compound No. | $LD_{50}$ mg./kg. (in mouse) | | A test (in mouse) | | B test (in rat) | |
|---|---|---|---|---|---|---|
| | i.v. | p.o. | Doses (per os) in mg./kg. | Duration of complete analgesia in minutes | Doses (per os) in mg./kg. | Percentage of inhibition |
| 1094 | 250 | 1,065 | 500 | 4 to 10 | 500 | 40 |
| 1105 | 140 | 900 | 500 | 4 to 8 | 500 | 40 |
| 1106 | 120 | 805 | 500 | 4 to 10 | 500 | 40 |
| 1107 | 165 | 840 | 500 | 4 to 8 | 500 | 40 |
| 1109 | 40 | 120 | 50 | 4 to 8 | 50 | 50 |
| 1123 | 225 | 1,240 | 500 | 4 to 10 | 500 | 50 |

The new compounds may be used in human therapeutics for the same purposes as aspirin and presented for such uses in the same manner, more particularly in association with a carrier for oral administration. These compounds, more especially compound No. 1079 show the very important advantage that they induce analgesia after a relatively very short period, of the order of 10 minutes after ingestion.

Two examples of compositions for tablets are as follows:

(1)

G.
Compounds No. 1079, 1094, 1105, 1106, 1107 or 1123 _____ 0.50
Starch tabletting carrier _____ 0.10

(2)
Compound No. 1109 _____ 0.15
Starch tabletting carrier _____ 0.10

Generally speaking, each dosage unit may contain from 0.25 to 0.80 gram of an acid compound from group 1 above, or from 0.10 to 0.40 gram of compound No. 1109; the daily dose may vary from 0.25 to 4 grams for acid compounds and from 0.10 to 2.5 g. for compound No. 1109.

What we claim is:

A compound selected from the class consisting of 2-(4-chlorophenoxyacetyloxy) benzoic acid, 2-[alpha-(4-chloro-phenoxy) - propionyloxy] benzoic acid, 2 - (2,4 - dichloro - phenoxy - acetyloxy) benzoic acid, 2 - (4 - chloro - phenylthio - acetyloxy) benzoic acid, 2 - (4 - chlorophenoxy - acetyloxy) benzamide and 2 - (alpha - naphthylacetyloxy) benzoic acid.

References Cited

Paolini et al., Beilsteins Handbuch der Organischen Chemie, Vierte Auflage, Springer-Verlag, Berlin, 1949, Band X, p. 43.

LORRAINE A. WEINBERGER, *Primary Examiner.*

THOMAS L. GALLOWAY, JR., *Assistant Examiner.*